(12) United States Patent
Kim et al.

(10) Patent No.: US 10,517,029 B2
(45) Date of Patent: Dec. 24, 2019

(54) METHOD AND APPARATUS FOR APPLYING RESOURCES IN HETEROGENEOUS NETWORK SYSTEM

(71) Applicant: Samsung Electronics Co., Ltd., Suwon-si, Gyeonggi-do (KR)

(72) Inventors: Eunyong Kim, Yongin-si (KR); Byungwook Jun, Seoul (KR); Jaewon Kang, Seoul (KR); Seungjoo Maeng, Seongnam-si (KR); Seunghee Han, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/114,596

(22) PCT Filed: Jan. 28, 2015

(86) PCT No.: PCT/KR2015/000885
§ 371 (c)(1),
(2) Date: Jul. 27, 2016

(87) PCT Pub. No.: WO2015/115787
PCT Pub. Date: Aug. 6, 2015

(65) Prior Publication Data
US 2016/0345338 A1    Nov. 24, 2016

Related U.S. Application Data
(60) Provisional application No. 61/932,513, filed on Jan. 28, 2014.

(30) Foreign Application Priority Data
Apr. 3, 2014    (KR) .................. 10-2014-0040199

(51) Int. Cl.
*H04W 72/04*    (2009.01)
*H04W 74/04*    (2009.01)
(Continued)

(52) U.S. Cl.
CPC .......... *H04W 36/20* (2013.01); *H04L 1/1822* (2013.01); *H04W 16/04* (2013.01); *H04W 16/06* (2013.01);
(Continued)

(58) Field of Classification Search
None
See application file for complete search history.

(56) References Cited

U.S. PATENT DOCUMENTS 9,615,366 B2    4/2017    Ohta et al.
10,039,095 B2   7/2018    Yoshizawa et al.
(Continued)

FOREIGN PATENT DOCUMENTS

CN    102792747 A    11/2012
CN    103220678 A    7/2013
(Continued)

OTHER PUBLICATIONS

Nokia Siemens Networks et al, 'Enhanced Fast ABS Adaptation for Rel-12 Small Cell Scenario 1', R1-132304, 3GPP TSG RAN WG1 #73 Meeting, Japan, Fukuoka, May 11, 2013.
(Continued)

*Primary Examiner* — Duc T Duong
(74) *Attorney, Agent, or Firm* — Jefferson IP Law, LLP (57) ABSTRACT

The present invention relates to a method and an apparatus for applying wireless resources in order to control inter-cell interference in a heterogeneous network system. The method for applying wireless resources provided by the present invention generates an almost blank subframe (ABS) pattern on the basis of the type of data transmitted from at
(Continued)

least one of a first base station and a second base station, applies a non-ABS or an ABS to wireless resources of the first base station according to the generated ABS pattern, and performs data communication by using the wireless resources to which the ABS has been applied.

20 Claims, 8 Drawing Sheets

(51) Int. Cl.
| | |
|---|---|
| H04W 84/04 | (2009.01) |
| H04W 36/20 | (2009.01) |
| H04W 16/04 | (2009.01) |
| H04W 16/06 | (2009.01) |
| H04W 16/08 | (2009.01) |
| H04W 24/02 | (2009.01) |
| H04L 1/18 | (2006.01) |
| H04W 28/02 | (2009.01) |
| H04W 68/00 | (2009.01) |
| H04W 74/08 | (2009.01) |
| H04W 24/10 | (2009.01) |
| H04W 28/08 | (2009.01) |
| H04W 16/32 | (2009.01) |
| H04W 36/04 | (2009.01) |
| H04W 72/08 | (2009.01) |

(52) U.S. Cl.
CPC ........... *H04W 16/08* (2013.01); *H04W 24/02* (2013.01); *H04W 24/10* (2013.01); *H04W 28/0236* (2013.01); *H04W 28/08* (2013.01); *H04W 68/005* (2013.01); *H04W 72/042* (2013.01); *H04W 72/0413* (2013.01); *H04W 72/0446* (2013.01); *H04W 74/0833* (2013.01); *H04W 16/32* (2013.01); *H04W 36/04* (2013.01); *H04W 72/0486* (2013.01); *H04W 72/082* (2013.01)

(56) References Cited

U.S. PATENT DOCUMENTS

| | | |
|---|---|---|
| 2009/0310561 A1 | 12/2009 | Grob et al. |
| 2011/0096660 A1 | 4/2011 | Ikeda et al. |
| 2011/0300807 A1 | 12/2011 | Kwun et al. |
| 2012/0115541 A1 | 5/2012 | Suga |
| 2012/0190365 A1 | 7/2012 | Jeong et al. |
| 2012/0307808 A1 | 12/2012 | Song et al. |
| 2013/0044600 A1* | 2/2013 | Sridhar ................. H04W 36/04 370/235 |
| 2013/0044704 A1* | 2/2013 | Pang ................. H04W 72/0426 370/329 |
| 2013/0045694 A1 | 2/2013 | Nakamura |
| 2013/0065599 A1 | 3/2013 | Chan et al. |
| 2013/0084865 A1 | 4/2013 | Agrawal et al. |
| 2013/0107798 A1* | 5/2013 | Gao ................. H04W 72/1226 370/328 |
| 2013/0109384 A1 | 5/2013 | Abe et al. |
| 2013/0142175 A1* | 6/2013 | Manssour ......... H04W 72/1252 370/336 |
| 2013/0230014 A1 | 9/2013 | Kitaji |
| 2013/0237233 A1 | 9/2013 | Radulescu et al. |
| 2013/0244664 A1 | 9/2013 | Song et al. |
| 2013/0250764 A1 | 9/2013 | Vasudevan et al. |
| 2013/0272274 A1* | 10/2013 | Ishida ................. H04W 72/082 370/336 |
| 2013/0286849 A1 | 10/2013 | Park |
| 2013/0286906 A1* | 10/2013 | Seo ................. H04W 72/0426 370/280 |
| 2013/0329636 A1 | 12/2013 | Jiang et al. |
| 2013/0343270 A1* | 12/2013 | Abe ................. H04W 36/0005 370/328 |
| 2014/0044059 A1* | 2/2014 | Hirata ............... H04W 72/0446 370/329 |
| 2014/0064237 A1* | 3/2014 | Lee ......... H04L 5/0055 370/329 |
| 2014/0198659 A1 | 7/2014 | Vargas Bautista et al. |
| 2014/0204861 A1* | 7/2014 | Tie ......... H04W 52/24 370/329 |
| 2014/0254512 A1* | 9/2014 | Ron ......... H04L 1/20 370/329 |
| 2014/0254537 A1* | 9/2014 | Kim .............. H04W 52/243 370/329 |
| 2014/0321434 A1 | 10/2014 | Gayde et al. |
| 2015/0016374 A1* | 1/2015 | Liang ............. H04W 52/16 370/329 |
| 2015/0029891 A1 | 1/2015 | Hwang et al. |
| 2015/0031369 A1 | 1/2015 | Gunnarsson et al. |
| 2015/0085767 A1 | 3/2015 | Einhaus et al. |
| 2015/0119053 A1* | 4/2015 | Morimoto ............. H04W 16/08 455/450 |
| 2015/0126237 A1* | 5/2015 | Nagata ................. H04W 52/54 455/522 |
| 2015/0131553 A1* | 5/2015 | Centonza .............. H04W 24/10 370/329 |
| 2015/0146622 A1* | 5/2015 | Ren ......... H04L 5/005 370/328 |
| 2015/0207596 A1 | 7/2015 | Kroener et al. |
| 2015/0208410 A1* | 7/2015 | Koutsimanis ......... H04W 24/10 370/252 |
| 2015/0223135 A1 | 8/2015 | Ratasuk et al. |
| 2015/0327225 A1* | 11/2015 | Xia ......... H04W 28/06 370/329 |
| 2015/0350919 A1 | 12/2015 | Patel et al. |
| 2015/0358887 A1 | 12/2015 | Xu et al. |
| 2015/0358974 A1 | 12/2015 | Jung et al. |
| 2015/0373728 A1* | 12/2015 | Cui ......... H04W 72/04 370/252 |
| 2016/0066315 A1 | 3/2016 | Zhang |
| 2016/0233972 A1 | 8/2016 | Dinan |
| 2017/0127309 A1* | 5/2017 | Siomina ............... H04W 24/10 |
| 2017/0332394 A1 | 11/2017 | Lu |

FOREIGN PATENT DOCUMENTS

| | | |
|---|---|---|
| CN | 103313312 A | 9/2013 |
| CN | 103369610 A | 10/2013 |
| CN | 103379574 A | 10/2013 |
| CN | 103686835 A | 3/2014 |
| EP | 2 640 124 A1 | 9/2013 |
| GB | 2532792 A | 6/2016 |
| JP | 2008-259046 A | 10/2008 |
| JP | 2011-35763 A | 2/2011 |
| JP | 2012-100220 A | 5/2012 |
| JP | 2013-526820 A | 6/2013 |
| WO | 2013/112090 A1 | 8/2013 |
| WO | 2013-118567 A1 | 8/2013 |
| WO | 2013/135475 A1 | 9/2013 |
| WO | 2013/141624 A1 | 9/2013 |
| WO | 2013/152488 A1 | 10/2013 |
| WO | 2015/183575 A1 | 12/2015 |

OTHER PUBLICATIONS

CATT, Considering UE Type for MLB Enhancement, 3GPP TSG RAN WG3 Meeting #79, Jan. 28-Feb. 1, 2013, pp. 1-3, R3-130047, XP050670870, Malta.

Fujitsu, Son Functions vs. UE Types in CRE Scenarios, 3GPP TSG-RAN WG3 #79, Jan. 28-Feb. 1, 2013, pp. 1-4, R3-130056, XP050670879, Malta.

3rd Generation Partnership Project; Technical Specification Group Radio Access Network; Study on Small Cell enhancements for E-UTRA and E-UTRAN; Higher layer aspects (Release 12), 3GPP TR 36.842, V12.0.0, Dec. 2013, pp. 1-71, XP050907459, Sophia-Antipolis, France.

(56) References Cited

OTHER PUBLICATIONS

Alcatel-Lucent, Connected Mode Paging Enhancement, 3GPP TSG-RAN WG2 Meeting #77bis, Mar. 26-30, 2012, R2-121839, XP050606493, Jeju, Korea.
European Search Report dated Oct. 16, 2017, issued in the European Application No. 15744012.4-1505 / 3101936.
European Search Report dated Oct. 30, 2017, issued in the European Application No. 15742696.6-1505 / 31101934.
European Search Report dated Nov. 2, 2017, issued in the European Application No. 15743680.9-1505 / 3101935.
U.S. Non-Final Office Action dated Mar. 22, 2018, issued in U.S. Appl. No. 15/114,589.
Hisham El Shaer, Interference Management in LTE-Advanced Heterogeneous Networks Using Almost Blank Subframes, Master's Degree Project Stockholm, Sweden; XR-EE-SB 2012:006; Mar. 2012.
International Search Report dated May 12, 2015, issued in International Application No. PCT/KR2015/000879.
International Search Report dated Apr. 30, 2015, issued in International Application No. PCT/KR2015/000880.
U.S. Office Action dated Jul. 24, 2018, issued in U.S. Appl. No. 15/114,626.
U.S. Office Action dated Aug. 23, 2018, issued in U.S. Appl. No. 15/114,589.
Ismail Guvenc, 'Range Expansion and Inter-Cell Interference Coordination (ICIC) for Picocell Networks', Vehicular Technology Conference, (VTC Fall), 2011 IEEE, Sep. 5, 2011-Sep. 8, 2011.
Chinese National Intellectual Property Office Action dated Mar. 20, 2019, issued in Chinese Application No. 201580006367.7.
Chinese National Intellectual Property Office Action dated Feb. 15, 2019, issued in Chinese Application No. 201580006389.3.
Japanese Notice of Reasons for Refusal dated Jan. 4, 2019, issued in Japanese Application No. 2016-549125.
United States Patent Office Action dated Feb. 12, 2019, issued in U.S. Appl. No. 15/114,626.
United States Notice of allowance dated Jan. 15, 2019, issued in U.S. Appl. No. 15/114,589.
A U.S. Office Action dated Oct. 2, 2019, issued by the U.S. Patent and Trademark Office U.S. Appl. No. 15/114,626.

* cited by examiner

METHOD AND APPARATUS FOR APPLYING RESOURCES IN HETEROGENEOUS NETWORK SYSTEM

TECHNICAL FIELD

The present invention relates to a method and apparatus for allocating radio network resources in a heterogeneous network system. In detail, the present invention relates to a method and apparatus for allocating radio resources of an eNB for controlling inter-cell interference in a heterogeneous network (HetNet) system. In particular, the present invention relates to a technology for improving bodily-felt performance of a UE by balancing the load between a high throughput eNB (macro cell) and a low throughput eNB (pico cell) operating on the same frequency in a heterogeneous network (HetNet) environment.

BACKGROUND ART

Recently, research has been conducted on pico cells for distributing the load of a macro cell in the 3GPP. The heterogeneous network environment where macro and pico cells coexist has come into the spotlight because it offers the possibility of improving system performance in comparison with the legacy macro cell environment.

The 3GPP has proposed an enhanced Inter-Cell Interference Coordination (eICIC) (or time-domain ICIC) technique for balancing the load between the macro and pico cells more effectively.

Since it is typical that a pico cell with low transmission power has a short antenna in comparison with the macro cell, it is difficult to balance the load between the macro and pico cells efficiently, especially when using an eNB-UE association rule (rule for the eNB with the highest signal strength to serve the UE).

That is, if the UEs select the cell with the highest Reference Signal Received Power (RSRP) as their serving cell, a certain UE may connect to the macro cell even when a pico cell is the best cell. Such a UE is likely to cause interference within the pico cell and thus degrade total network throughput. Also, if the number of UEs connected to the macro cell is much smaller than the number of UEs connected to the pico cell, this is very inefficient in view of resource utilization.

In order to solve the above problems, the eICIC uses a Cell Range Expansion (CRE) technique for providing the UE with criteria for handover between macro and pico cells. That is, the eICIC is designed such that the UE selects the pico cell from which the signal strength is greater than a value acquired by reflecting a CRE bias (unit: dB) to the signal strength from the macro cell as the serving cell of the UE in order to improve the load balancing effect.

However, the UEs that have connected to the pico cell due to the CRE bias may suffer interference from the macro cell because the RSRP from the macro cell is still stronger than that of the pico cell.

DISCLOSURE OF INVENTION

Technical Problem

The present invention has been conceived to solve the above problems and aims to provide a method and apparatus for allocating resources for controlling the interference from the macro cell to the UE located within a CRE region as an extended coverage of the pico cell.

Solution to Problem

In accordance with an aspect of the present invention, a resource allocation method of a first base station in a heterogeneous network system includes generating an Almost Blank Subframe (ABS) pattern based on the type of data transmitted by at least one of the first base station and a second base station, applying ABSs or non-ABSs to radio resources of the first base station according to the ABS pattern, and performing data communication using the radio resources to which the ABSs or non-ABSs are applied.

In accordance with another aspect of the present invention, a first base station for allocating radio resources in a heterogeneous network system includes an Almost Blank Subframe (ABS) pattern generation unit for generating an ABS pattern based on the type of data transmitted by the first base station and a second base station, a macro control unit for applying ABSs or non-ABSs to radio resources of the first base station according to the ABS pattern, and a radio communication unit for performing data communication using the radio resources to which the ABSs or non-ABSs are applied.

In accordance with another aspect of the present invention, a resource allocation method of a second base station in a heterogeneous network system includes receiving an Almost Blank Subframe (ABS) pattern from a first base station, reconfiguring the ABS pattern based on the type of data transmitted by at least one of the first and second base stations, applying ABSs or non-ABSs to radio resources of the second base station according to the ABS pattern, and performing data communication using the radio resources to which the ABSs or non-ABSs are applied.

In accordance with still another aspect of the present invention, a second base station for allocating radio resources in a heterogeneous network system includes an Almost Blank Subframe (ABS) pattern reception unit for receiving an ABS pattern from a first base station, a control unit for reconfiguring the ABS pattern based on the type of data transmitted by at least one of the first and second base stations and applying ABSs or non-ABSs to radio resources of the second base station according to the ABS pattern, and a radio communication unit for performing data communication using the radio resources to which the ABSs or non-ABSs are applied.

Advantageous Effects of Invention

The resource allocation method and apparatus of the present invention for use in a heterogeneous network system is advantageous in terms of mitigating interference from the macro cell to the UE located within the CRE area as the extended coverage of the pico cell.

Also, the resource allocation method and apparatus of the present invention for use in a heterogeneous network system is advantageous in terms of being applied stably without modification of the legacy LTE standard and eICIC specification.

Also, the resource allocation method and apparatus of the present invention for use in a heterogeneous network system is advantageous in terms of expanding the coverage of the pico cell 203 and improving a user's bodily-felt quality through load balancing between the macro cell 201 and the pico cell 203.

MODE FOR THE INVENTION

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make clear the subject matter of the present invention.

The terms used in the following description are provided to help understanding the present invention and may be modified into different forms without departing from the spirit of the present invention.

The following description is applicable to various radio access systems including Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA) systems. The CDMA system may be implemented in the form of a radio technology such as Universal Terrestrial Radio Access (UTRA) and CDMA2000. The TDMA may be implemented in the form of a radio technology such as Global System for Mobile communications (GSM), General Packet Radio Service (GPRS), and Enhanced Data Rates for GSM Evolution (EDGE). The OFDMA system may be implemented in the form of a radio technology such as IEEE 802.11 (Wi-Fi), IEEE 802.16 (WiMAX), IEEE 802.20, and Evolved UTRA (E-UTRA). The UTRA is a part of the Universal Mobile Telecommunications System (UMTS). The 3$^{rd}$ Generation Partnership Project Long Term Evolution (3GPP LTE) is a part of the Evolved UMTS (E-UMTS) using the E-UTRA and adopts OFDMA in downlink and SC-FDMA in uplink. LTE-Advanced (LTE-A) is an evolved standard of the 3GPP LTE. The WiMAX may be described as the IEEE 802.16e standard (WirelessMAN-OFDMA Reference System) and advanced IEEE 802.16m standard (WirelessMANOFDMA Advanced system). Although the following description is directed to the 3GPP LTE and LTE-A systems for clarity, the technical concept of the present invention is not limited thereto.

Figure 1:
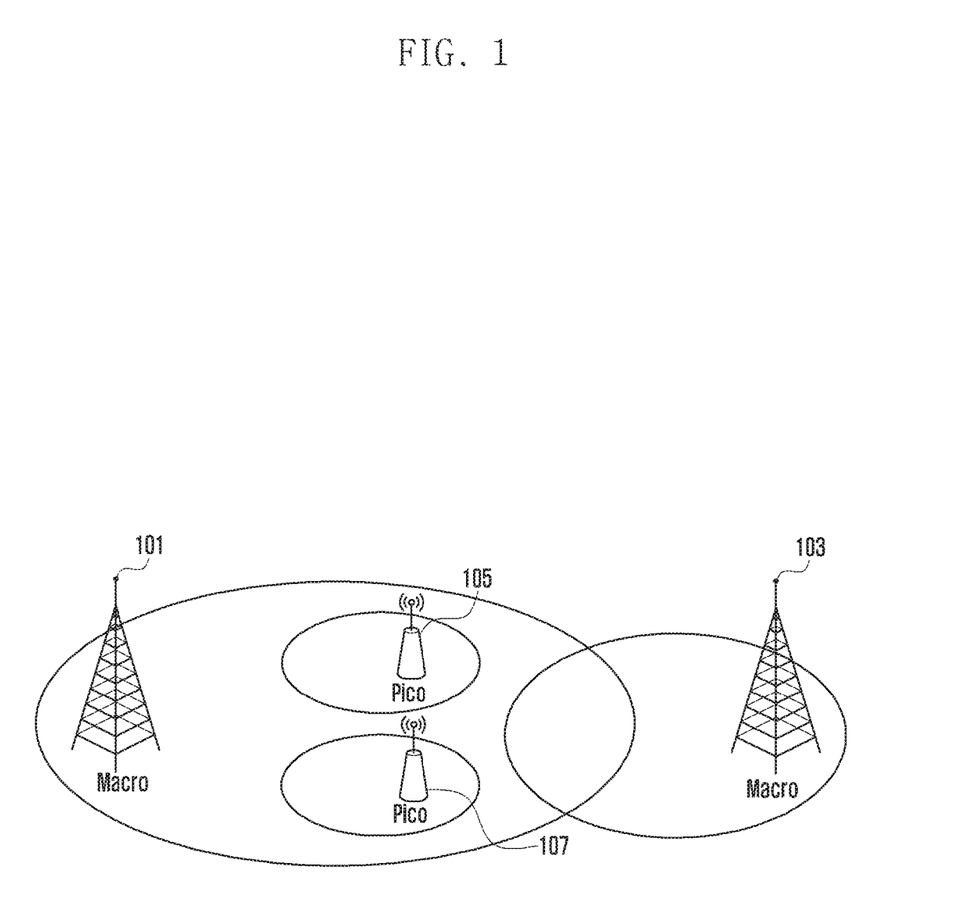
FIG. 1 is a diagram illustrating the wireless communication system architecture to which the present invention is applied.

FIG. 1 is a diagram illustrating the wireless communication system architecture to which the present invention is applied.

Referring to FIG. 1, the wireless communication system to which the present invention is applied includes at least one macro cell and at least one pico cell.

In the following description, the term "heterogeneous network system" denotes the system in which macro eNBs 101 and 103 and pico eNBs 105 and 107 operating on the same Radio Access Technology (RAT) coexist.

In the following description, the macro eNBs 101 and 103 may be interchangeably referred to as macro cells, macro cell eNBs, and first eNBs; the pico eNBs 105 and 107 may be interchangeably referred to as pico cells, pico cell eNBs, and second eNBs.

At least one macro cell may be served by the macro eNBs 101 and 103, and at least one pico cell may be served by the pico eNBs 105 and 107. The pico cells serve part of UEs within the macro cell for load balancing.

The transmission powers of the pico eNBs 105 and 107 may be lower than those of the macro eNBs 101 and 103, and it is typical that the coverage of the pico cells of the pico eNBs 105 and 106 is smaller than that of the macro cell.

The UE may connect to the macro cell or the pico cell to perform data communication with the eNB. In an embodiment, the UE may select the cell having the greatest RSRP as its serving cell. If the serving cell is selected based on RSRP, the UE may connect to the macro cell even though a pico cell is the best cell for it. In this case, the UE connected to the macro cell may cause interference to the UEs served by the pico cell because it is located close to the pico cell.

Figure 2:
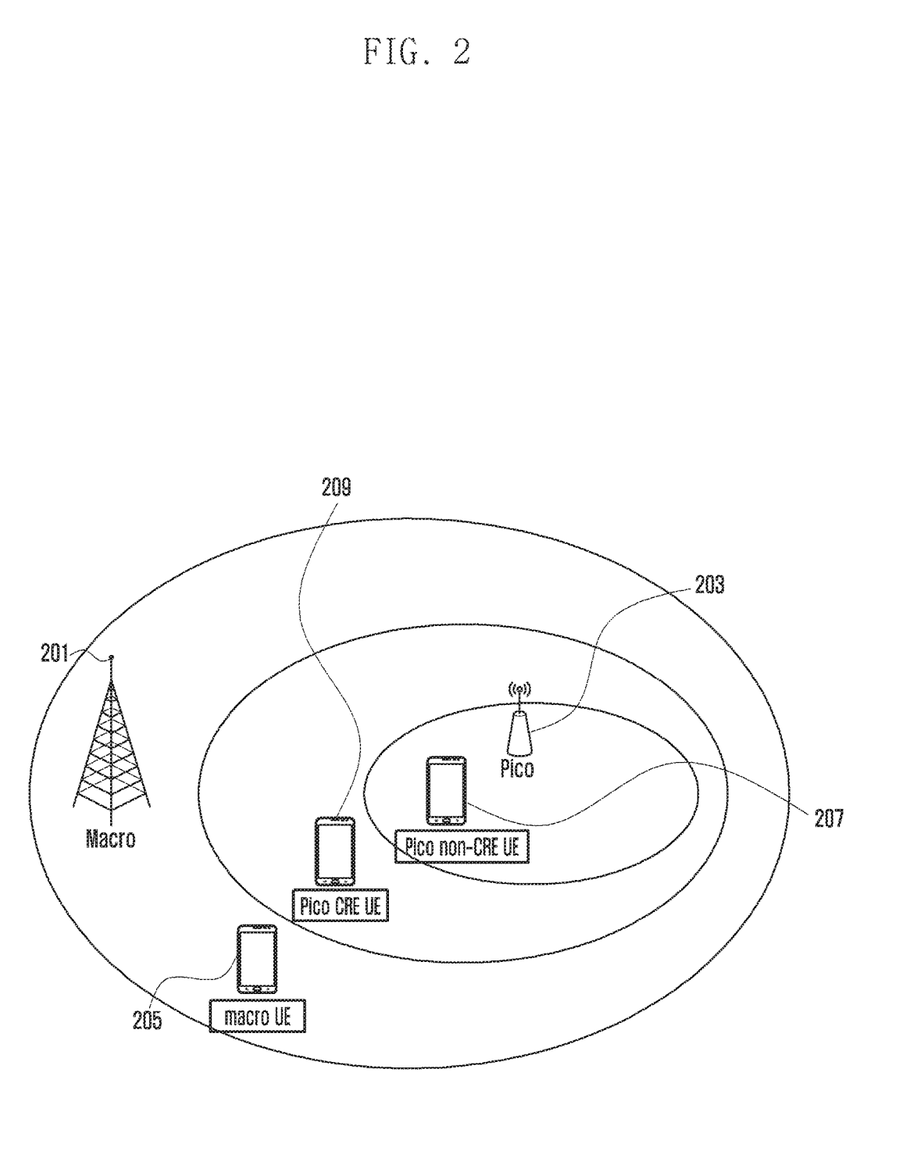
FIG. 2 is a diagram for explaining a CRE UE.

For this reason, the CRE area is defined in order for the pico cell to serve part of the UEs having the strong RSRP from the macro cell, and a description thereof is made in detail with reference to FIG. 2.

FIG. 2 is a diagram for explaining a CRE UE.

In the wireless communication system of FIG. 2, the UEs served by the pico cell may include a CRE UE 209 and a non-CRE UE 207.

Referring to FIG. 2, if the RSRP from the macro eNB 201 is greater than the RSRP from the pico eNB 203 within the macro cell, the UE is served by the macro eNB 201. In the following description, the UE 205 served by the macro eNB 201 is referred to as a macro UE. The macro UE 205 served by the macro eNB 201 is not suffering significant interference from the pico cell.

If the RSRP from the macro eNB 201 is less than the RSRP from the pico eNB 203 within the macro cell, the UE is served by the pico eNB 203. In the following description, the UE 207 served by the pico eNB 203 is referred to as a pico UE or non-CRE UE.

According to an embodiment of the present invention, part of the UEs having the RSRP from the macro eNB 201 that is greater than the RSRP from the pico eNB 203 connect to the pico eNB 203 under the control of the network. This is designed to increase the data rate of the UE through load balancing between the pico and macro cells. At this time, the network may control such that the UE of which the pico cell signal strength is greater than a value acquired by reflecting CRE bias (unit: dB) to the macro cell signal strength connects to the pico eNB 203.

If part of the UEs located outside the coverage of the pico cell are served by the pico cell, this gives an effect of defining a new area between the macro cell and the pico cell;

in the following description, this area is referred to as a CRE area, and the UE 209 operating in the CRE area is referred as a CRE UE.

According to an embodiment of the present invention, the CRE area may be referred to as a reserved area. According to an embodiment of the present invention, the reserved area may be considered as an area configured for inter-cell load balancing.

In an embodiment, the CRE UE 209 is a UE suffering significant interference from the macro cell, and the non-CRE UE 207 is a UE suffering less interference from the macro cell.

Since the CRE UE 209 is served by the pico eNB 203 from which the RSRP is relatively weak even though it is located within the area where the RSRP from the macro eNB 201 is strong, it suffers significant interference from the macro cell. Accordingly, the macro eNB 201 configures part of subframes as Almost Blank Subframes (ABSs) which carry no downlink data as far as possible to mitigate interference to the CRE UE 209. Since the pico cell is suffering almost no interference from the macro cell during the ABSs, it is possible to improve the performance of the CRE UE 209 in such a way that the pico eNB 203 allocates resources to the CRE UE 209 during the ABS.

If the macro eNB 201 increases the ratio of the ABS, interference-free time of the pico cell increases, and this increase improves the throughputs of the UEs served by the pico cell. However, this causes downlink transmission delay of the macro cell; thus the throughput of the macro UE 205 served by the macro eNB 201 decreases. If the ABS ratio increases because there is a large number of CRE UEs 209, even though a large number of subframes is required in order for the macro UE 205 to receive downlink data, this is likely to degrade whole network throughput and network efficiency.

Thus, the present invention provides a method for the macro and pico eNBs 201 and 203 to allocate radio resources based on an ABS pattern that is capable of reducing interference from the macro cell to the CRE UE 209.

In the following description, the macro and pico eNBs 201 and 203 are referred to as the first and second eNBs, respectively, for convenience of explanation.

If the first eNB 201 has a signal to transmit immediately and transmits the signal even during the ABS, the CRE UE may suffer unexpected interference from the first eNB. In contrast, if the first eNB suspends transmission of the signal, the user served by the first eNB fails to receive the scheduled signal.

In the case that the subframes predetermined for the CRE UE to receive the broadcast information (e.g., SIB-1 of the 3GPP LTE) stably are configured as ABSs, the first eNB may not broadcast the corresponding information.

In the case that predetermined subframes predetermined for the CRE UE to receive paging information are configured as ABSs or non-ABSs, the first eNB may not transmit the paging information or the CRE UE cannot receive the paging information stably.

According to the ABS pattern proposed in the present invention, the first eNB may provide the second eNB suffering interference from the corresponding cell with the ABS pattern. According to the eICIC specification of the 3GPP LTE FDD, the ABS pattern is a 40-bit string repeating every 40 ms to restrict the transmit power (Tx Power) of the first eNB. For example, the first bit of the 40-bit string may indicate whether to restrict the Tx power in the first subframe during the 40 ms period. If the corresponding bit is set to 1 (=ABS), this means that the Tx power of the first eNB decreases; otherwise, if the corresponding bit is set to 0 (=nonABS), this means that the first eNB may not be affected by a special Tx power restriction. It is typical that the CRE UE suffers significant interference from the first eNB in the case of using the eICIC technique; thus, in order to improve the radio channel quality, it is advantageous to allocate radio resource during the ABS in which the Tx power of the first eNB decreases. That is, the ABS pattern informs the second eNB whether the Tx power of the first eNB increases/decreases explicitly so as to make it possible for the CRE UE located within the extended coverage of the second eNB to perform radio communication stably.

Meanwhile, the resource restriction technique allows the user to measure the channel condition in predetermined subframes. In detail, the eNB may provide the UE with the information of three patterns according to the resource restriction technique.

The first pattern (pattern 1) is 40-bit information indicating whether to measure Reference Signal Received Poser (RSRP) and Reference Signal Received Quality (RSRQ) of the serving cell as the eNB serving the UE and indicating subframes for determining radio link failure (RLF).

The second pattern (pattern 2) is 40-bit information indicating subframes in which the UE can measure RSRP and RSRQ of the neighboring cells.

The third pattern (pattern 3) is two pieces of 40-bit information, the first 40 bits indicating the ABS for measuring channel quality (CQI) and the second 40 bits indicating non-ABS for measuring channel quality. In contrast, it may also be possible to configure the first 40 bits to indicate the non-ABS for measuring channel quality and the second 40 bits to indicate the ABS for measuring channel quality. Accordingly, it may be possible to allow the user to measure the channel quality in the ABS and non-ABS selectively using the third pattern and allocate radio resources to the UE and determine a modulation and coding scheme (MCS) based on the measured channel quality.

In order to improve the entire throughput of the heterogeneous network including the first and second eNBs 201 and 203, it is necessary to determine the ratio of the ABSs among the entire subframes.

A description is made hereinafter of the apparatus and method according to an embodiment of the present invention for applying the above-described ABS patterns and resource restriction technique in compliance with the LTE standard.

Figure 3:
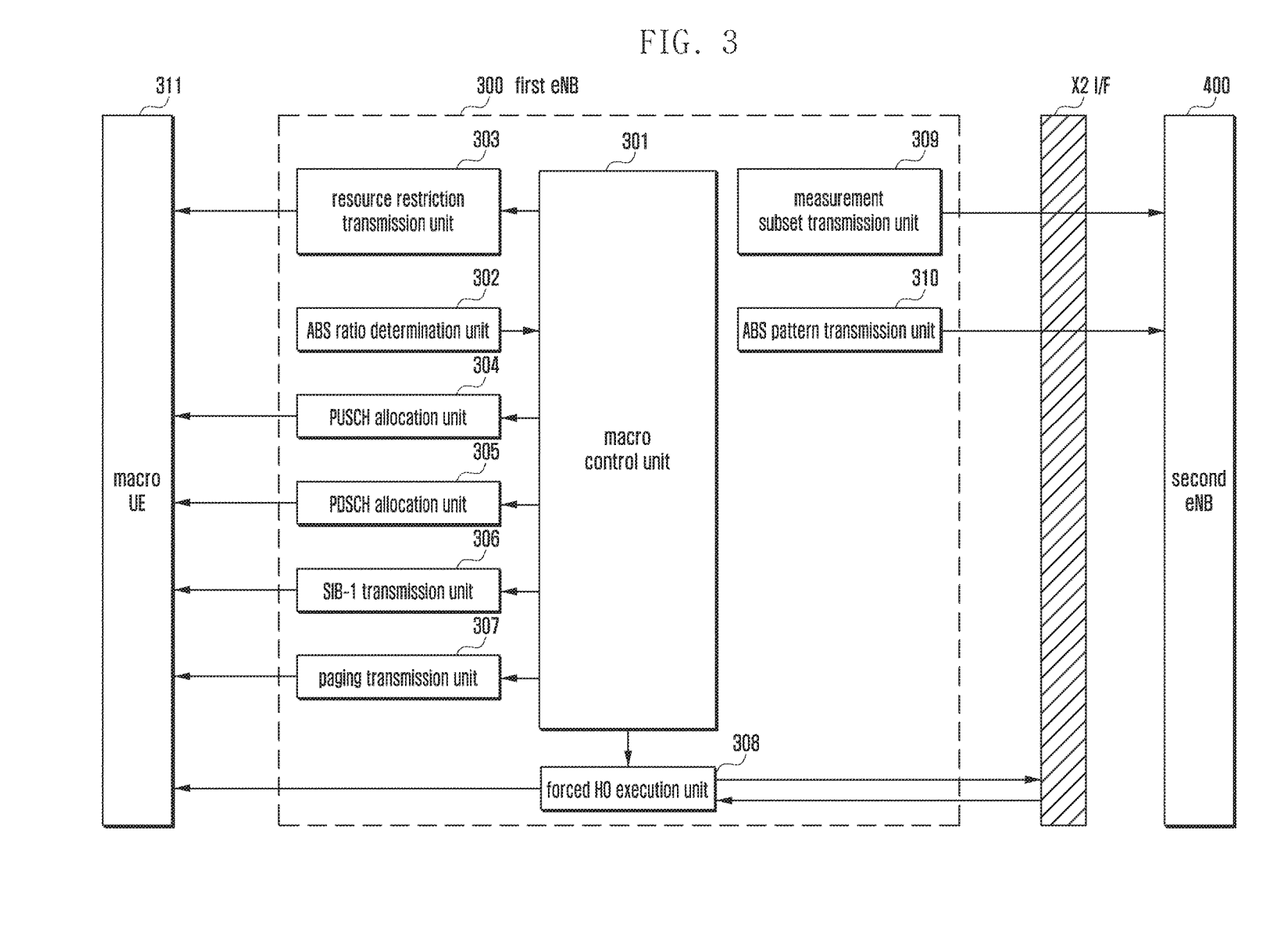
FIG. 3 is a block diagram illustrating a configuration of the first eNB according to an embodiment of the present invention.

FIG. 3 is a block diagram illustrating a configuration of the first eNB according to an embodiment of the present invention.

Referring to FIG. 3, the first eNB 300 according to an embodiment of the present invention may include a macro control unit 301, an ABS ratio determination unit 302, a resource restriction transmission unit 303, a PUSCH allocation unit 304, a PDSCH allocation unit 305, an SIB-1 transmission unit 306, a paging transmission unit 307, a forced HO execution unit 308, a measurement subset transmission unit 309, and an ABS pattern transmission unit 310.

The X2 I/F is an inter-evolved Node B (inter-eNB) interface (I/F) which is used only in the meaning of inter-eNB I/F in this block diagram.

The macro control unit 301 may receive an ABS ratio value from the ABS ratio determination unit 302. The ABS ratio is the information indicating the ratio between the ABS and non-ABS among the subframes during the 40 ms and may be updated as time goes by. That is, the ABS ratio may be determined in various manners and vary depending on the numbers of UEs served by the macro and pico cells. However, the ABS ratio determination method is not limited in the present invention.

The macro control unit 301 may generate an ABS pattern according to the determined ABS ratio.

The ABS pattern may restrict the signal transmission power of the first eNB 301. That is, the transmission (Tx) power of the first eNB 301 may be controlled to be very low in the ABSs but not restricted in the non-ABSs.

A description is made in detail later with reference to FIG. 5 of the method for generating an ABS pattern.

The ABS pattern transmission unit 310 may send the second eNB 400 the generated ABS pattern.

The macro control unit 301 may determine whether to allocate a Packet Uplink Shared Channel (PDSCH) to a macro UE based on the ABS pattern and send the determination result to the PUSCH allocation unit 304. The PUSCH is an uplink physical channel for unicast data transmission, and the PUSCH allocation unit 304 may allocate and transmit PUSCH depending on the determination made by the macro control unit 301 on whether to allocate PUSCH to the macro UE 311.

The macro control unit 301 may also determine whether to allocate a Packet Downlink Shared Channel (PDSCH) to the macro UE based on the ABS pattern and send the determination result to the PDSCH allocation unit 305. The PDSCH is a downlink physical channel for unicast data transmission, and the PDSCH allocation unit 305 may allocate and transmit PDSCH depending on the determination made by the macro control unit 301 on whether to allocate PDSCH to the macro UE 311.

The macro control unit 301 may also determine whether to transmit the System Information Block #1 (SIB-1) and a Resource Block for transmitting the SIB-1 and send the determination result to the SIB-1 transmission unit 306. The SIB-1 includes the information concerning whether the UE can camp on the corresponding cell. The SIB-1 transmission unit 306 may allocate SIB-1 resources and transmit the SIB-1 according to the determination of the macro control unit 301.

The macro control unit 301 may also determine whether to transmit a paging message and send the determination result to the paging transmission unit 307. The paging transmission unit 307 may allocate paging resources and transmit the paging message according to the determination of the macro control unit 301.

The macro control unit 301 may also determine a subframe set for use, by a user served by the second eNB 400, in measuring CQI during the ABSs according to the method for generating the ABS pattern and send the determination result to the measurement subset transmission unit 309. The measurement subset transmission unit 309 may notify the second eNB 400 of the subframe set.

The macro control unit 301 may also generate a 40-bit second pattern (pattern 2) for use by the macro UE 311 in measuring neighboring cell RSRP and RSRQ based on the subframe set and send the second pattern to the resource restriction transmission unit 303. The resource restriction transmission unit 303 may transmit the 40-bit second pattern (pattern 2) information to the macro UE 311.

Although the first eNB 201 according to an embodiment of the present invention is depicted in the drawing as a combination of individual components such as transmission units and allocation units, it should be noted that this is just for illustrative purposes; and it is obvious to those skilled in the art that some or all of the components can be selectively combined into an integrated module.

Figure 4:
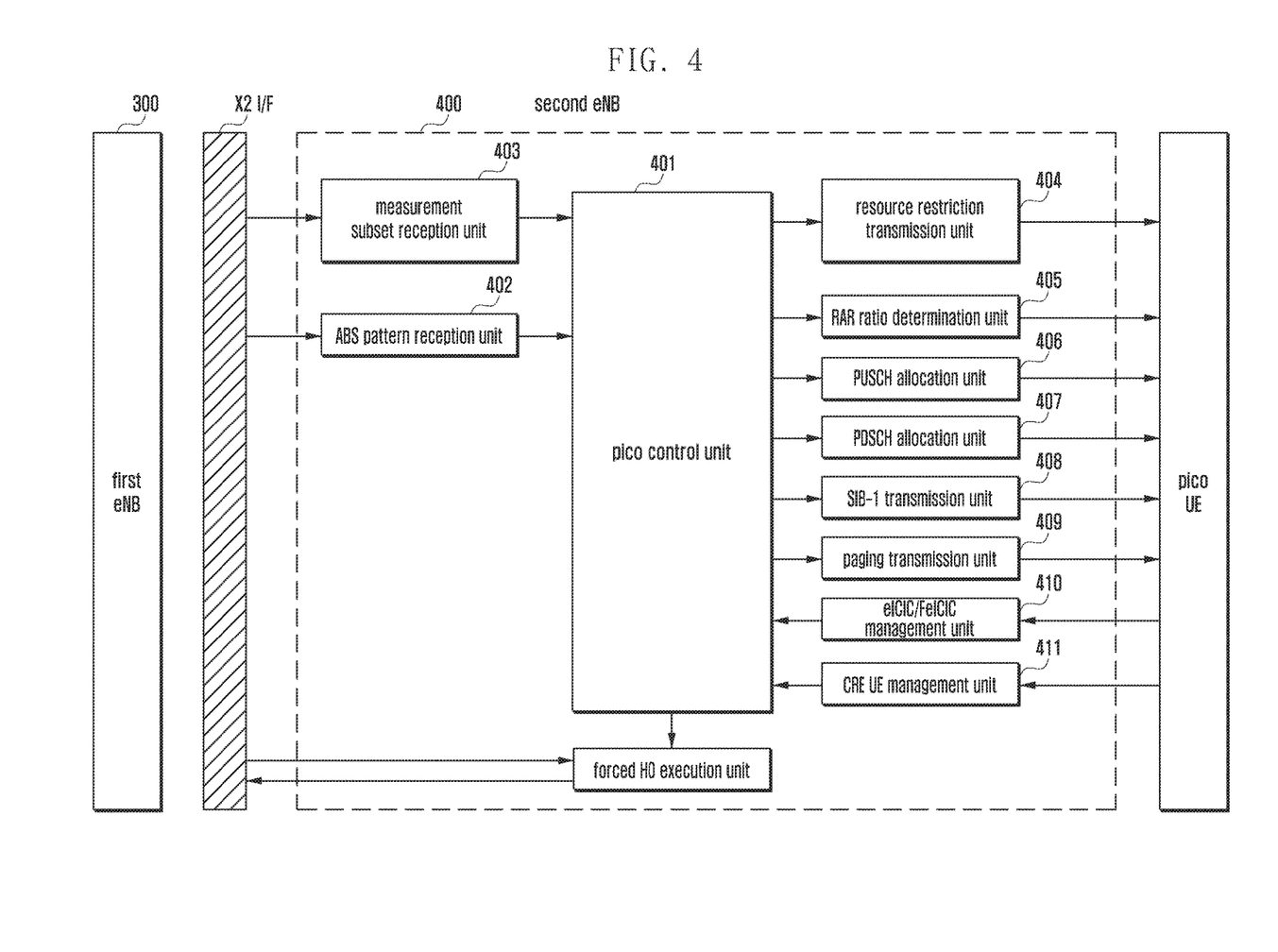
FIG. 4 is a block diagram illustrating a configuration of the second eNB according to an embodiment of the present invention.

FIG. 4 is a block diagram illustrating a configuration of the second eNB according to an embodiment of the present invention.

The second eNB 400 according to an embodiment of the present invention may include a pico control unit 401, an ABS pattern reception unit 402, a measurement subset reception unit 403, a resource restriction transmission unit 404, an RAR unit 405, a PUSCH allocation unit 406, a PDSCH allocation unit 407, an SIB-1 transmission unit 408, a paging transmission unit 409, an eICIC/FeICIC management unit 410, a CRE UE management unit 411, and a forced HO execution unit 412.

Descriptions are made hereinafter in detail of the components of the second base station 400.

The pico control unit 401 may reconfigure the ABS pattern received by means of the ABS pattern reception unit 402 according to the type of the data transmitted by at least one of the first and second eNBs 300 and 400. The ABS pattern reception unit 402 may receive the ABS pattern from the first eNB 300 and send the ABS pattern to the pico control unit 401. The ABS pattern reception unit 402 may receive the ABS pattern from the ABS pattern transmission unit 309 of the first eNB 300.

The pico control unit 401 may determine whether to transmit a Random Access Response (RAR) message for accepting access of the corresponding UE depending on whether the UE served by the second eNB 400 is a CRE UE and send the determination result to the RAR unit 405. The RAR unit 405 allocates RAR resource and transmits an RAR message according to the determination made by the pico control unit 401.

The CRE UE management unit 411 may determine whether the UE served by the second eNB 400 is a CRE UE and notify the pico control unit 401 of the determination result.

The pico control unit 401 determines whether to allocate PDSCH to the corresponding UE depending on the information indicating whether the UE served by the second eNB 400 is a CRE UE, the information being received from the CRE UE management unit 411, and send the determination result to the PDSCH allocation unit 407. The PDSCH allocation unit 407 may allocate and transmit PDSCH according to the determination result from the pico control unit 401.

The pico control unit 401 determines whether to allocate PUSCH to the corresponding UE depending on the information indicating whether the UE is a CRE UE and sends the determination result to the PUSCH allocation unit 406. The PUSCH allocation unit 406 allocates and transmits PUSCH according to the determination result from the pico control unit 401.

The pico control unit 401 determines whether to transmit SIB-1, whether to allocate SIB-1 resources, and RB restriction; and it sends the determination result to the SIB-1 transmission unit. The pico control unit 401 may also use the information indicating whether the pico terminal 420 supports a Further-enhanced Inter-Cell Interference Coordination (FeICIC) function, the information being received from the eICIC/FeICIC management unit 410. In detail, the SIB-1 transmission unit 408 allocates SIB-1 resources and transmits the SIB-1 according to the determination result from the pico control unit 401. The SIB-1 transmission unit 470 may also transmit the SIB-1 through higher level signaling for the UE supporting the FeICIC function.

The pico control unit 401 determines whether to transmit a paging message to the UE and sends the determination result to the paging transmission unit 409. The pico control unit 401 may also determine whether to perform a forced HO to the first eNB and sends the determination result to the forced HO execution unit 412 when an event triggering transmission of a Commercial Mobile Alert Service (CMAS) message or an Earthquake and Tsunami Warning System (ETWS) message is detected.

The paging transmission unit 409 allocates paging resources and transmits a paging message according to the determination made by the pico control unit 401. The forced HO execution unit 412 may perform the forced HO on the CRE UE according to the determination made by the pico control unit 401.

The pico control unit 401 may also generate the information indicating the first pattern (pattern 1), the second pattern (pattern 2), and the third pattern (pattern 3) for use, by the UE served by the second eNB 400, in measuring radio channel state based on the subframe set received from the management subset reception unit 403 and send the information to the resource restriction transmission unit 404. Meanwhile, the resource restriction transmission unit 403 may send the pico control unit 401 the subframe set information received from the first eNB 300.

Figure 5:
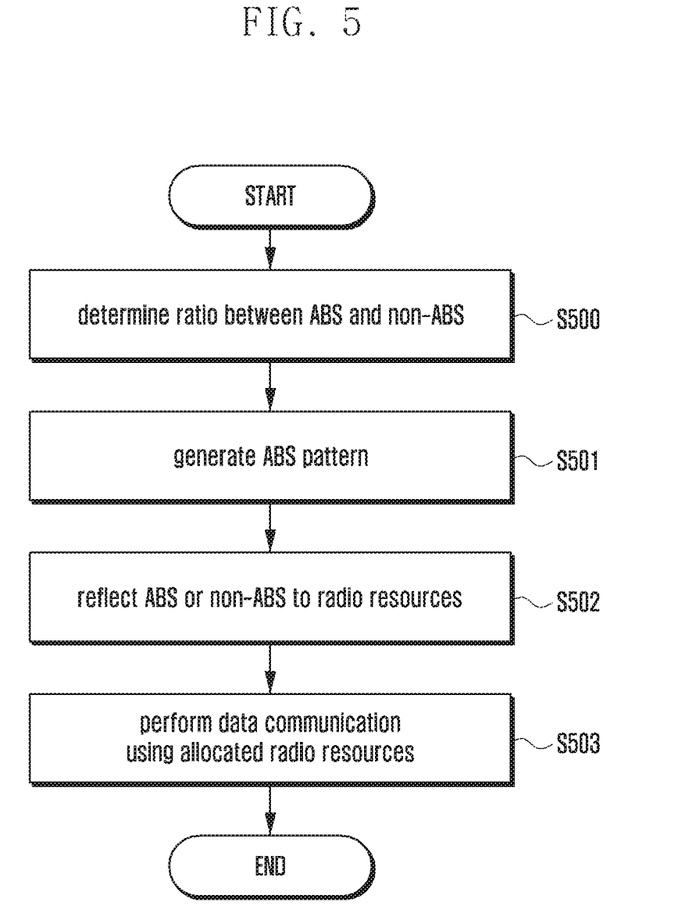
FIG. 5 is a flowchart illustrating a method for allocating resources according to an ABS pattern generated by the first eNB according to an embodiment of the preset invention.

FIG. 5 is a flowchart illustrating a method for allocating resources according to an ABS pattern generated by the first eNB according to an embodiment of the preset invention.

Figure 6:
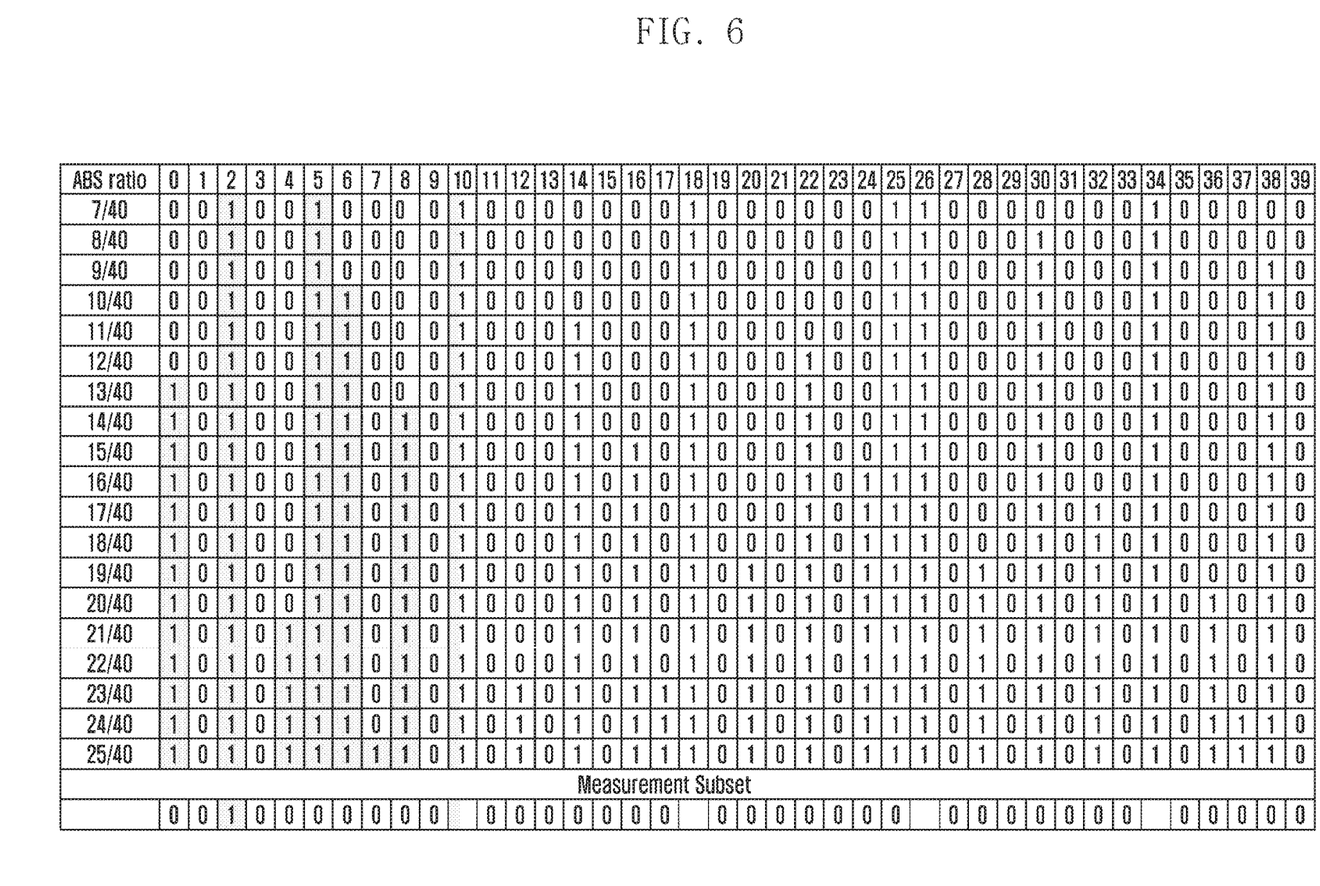
FIG. 6 is a diagram illustrating an exemplary ABS pattern generated according to an embodiment of the present invention.

FIG. 6 is a diagram illustrating an exemplary ABS pattern generated according to an embodiment of the present invention.

A description is made in detail hereinafter of the resource allocation method of the first eNB with reference to FIGS. 5 and 6.

The ABS ratio determination unit 302 determines the ratio of ABS to non-ABS at step S500. The ABS ratio indicates the ratio of ABS to non-ABS in the 40-bit ABS pattern information, and the number of subframes restricted in Tx power at the first eNB increases as the ABS ratio increases. The ABS ratio can be selected by various methods, and the present invention is not limited to any of the methods if such method can be used to determine the ratio of ABS to non-ABS.

The macro control unit 301 may determine the position of a new subframe to be converted to an ABS in consideration of the rules to be described later in order to increase the ABS ratio. In contrast, it may be possible to convert the ABS to non-ABS in order to decrease the ABS ratio in the reverse order of determining the position of the subframe as the ABS ratio increases.

If the ratio of ABS to non-ABS is determined, the macro control unit 301 may generate an ABS pattern based on the ABS ratio at step S501. The ABS pattern can be generated depending on the type of the data transmitted by the first and second eNBs 300 and 400, and the description thereof is made with reference to, but not limited to, the ABS pattern of FIG. 6 for convenience of explanation.

FIG. 6 shows an ABS pattern in which the ABS ratio is 7/40~25/40 according to a preferred embodiment.

According to an embodiment, the first rule for generating the ABS pattern is to designate the two subframes for SIB-1 transmission as ABSs. The reason for designating the subframes for SIB-1 transmission as ABSs is to make it possible for the UE located within the CRE area to receive the SIB-1.

The second rule for generating the ABS pattern is to designate ABSs depending on the Physical Hybrid-ARQ Indicator Channel (PHICH) transmitted by the second eNB. This is to designate the subframe appearing every 8 ms as an ABS in order for the CRE UE to receive the PDCCH carrying the uplink grant and the PHICH corresponding thereto by taking notice that the second eNB transmits a HARQ acknowledgement to acknowledge whether it is necessary to retransmit the data transmission block to the UE served by the second eNB.

Accordingly, the ABS pattern with the ABS ratio of 7/40 as shown in FIG. 6 designates two subframes carrying the SIB-1 and 5 subframes appearing at an interval of 8 ms as ABSs.

If the ABS ratio increases to 8/40~12/40, five new subframes appearing at the interval of 8 ms are designated one by one as ABSs. Accordingly, for the ABS ratio of 8/40~11/40, one set of subframes appearing at the interval of 8 ms is maintained while the number of aperiodic ABS subframes is increased by 1. If the ABS ratio reaches 12/40, 2 sets of ABSs appearing at the interval of 8 ms are formed.

According to an embodiment, the third rule for generating the ABS pattern is to designate the subframe that is predicted to carry the RAR for accepting the access of the UE to be handed over as ABSs with priority in increasing the number of ABSs by 1.

The reason for designating the subframe that is supposed to carry the RAR message as an ABS with priority is to make it possible for the UE to be handed over in a stable and quick manner to the second eNB to receive the RAR message transmitted by the second eNB during the ABSs of the first eNB.

According to an embodiment, the fourth rule for generating the ABS pattern is to designate the subframes carrying the paging message as non-ABSs.

This aims to allow the first eNB to transmit the paging message in the paging subframe without being obstructed.

If the ABS ratio becomes greater than 12/40, it may be possible to increase the number of the ABS subframes of the set of 5 subframes appearing at the interval of 8 ms according to the first to fourth rules. Although the ABS patterns with the ABS ratios up to 25/40 are shown in FIG. 6, it is obvious that the ABS ratio can be increased according to the above-described method.

The macro control unit 301 may reflect at step S502 the ABS pattern generated based on the ABS ratio to the radio resources. (It appears that the expression of "application" is not appropriate for the context. How about to use "application"? If so, it is necessary to correct S502 and S802 too.)

The macro control unit 301 decreases the Tx power of the first eNB to transmit only a minimum signal such as Cell-Specific RS (CRS) by restricting PDSCH transmission during the ABSs.

It may also be possible to decrease the Tx power of the first eNB through a power control for transmitting the PDSCH at a relatively low Tx power. Meanwhile, PDSCH transmission of the first eNB during the non-ABSs is not restricted.

The macro control unit 301 may restrict PUSCH transmission in advance to avoid PHICH transmission during the ABSs. For example, in the case of the LTE system that supports retransmissions 4 times including the initial transmission, the Physical Downlink Control Channel (PDCCH) with UL grant for PUSCH transmission is not transmitted in the subframes immediately before all ABSs of 8 ms, 16 ms, 24 ms, and 32 ms.

The macro control unit 301 does not transmit PDCCH with uplink grant for PUSCH in the ABSs to avoid PDCCH transmission in any ABS.

The first eNB 300 may also be allowed to transmit PHICH and PDCCH in ABSs and, in this case, the macro control unit 301 does not restrict PUSCH allocation.

If it is determined, by the macro control unit 301, to allocate radio resources, the PDSCH allocation unit 305 and the PUSCH application unit 304 may allocate PDSCH and PUSCH radio resources and transmit PDSCH and PUSCH according to the determination result at step S503.

The macro control unit 301 may also control the SIB-1 transmission unit 306 of the first eNB 300 to transmit the SIB-1 even when the subframe configured to transmit the SIB-1 is an ABS. However, the macro control unit 301 applies a restriction in order to prevent the SIB-1 of the first eNB and the SIB-1 of the second eNB from being transmitted in the same Resource Block (RB). For example, the macro control unit 301 may control the SIB-1 transmission unit 306 to transmit the SIB-1 in the consecutive RBs with the lowest indices. In this case, whether to use the downlink RB with no SIB-1 in the subframe configured for SIB-1 transmission is determined according to the transmission rule for use in ABSs. This aims to guarantee that even the CRE UE incapable of receiving the SIB-1 through signaling is able to receive the SIB-1 stably.

However, the UE supporting the Rel-11 Further-enhanced ICIC (FeICIC) function is capable of receiving SIB-1 through signaling; thus, it does not need to operate as described above.

The macro control unit 301 may also control the paging transmission unit 307 to transmit the paging message whenever necessary. This allows the UE in the idle state that monitors for paging messages only in predetermined subframes to receive the paging messages without any problem. For this purpose, the fourth rule for generating the ABS pattern does not designate the subframe configured for paging message transmission as ABS.

The macro control unit 301 may also determine a subframe set made of ABSs even when the ABS pattern varies because of the change of the ABS ratio with time and notify the second eNB 400 of the subframe set such that the UE served by the second eNB 400 can measure CQI stably during the ABSs; however, in order for the UE served by the second eNB 400 to measure CQI during the ABSs, it is necessary to inform of the subframes in which the Tx power of the first eNB 300 decreases. The measurement subset transmission unit 309 of the first eNB 300 may always notify the measurement subset reception unit 403 of the second eNB 400 of the subframe set made of ABSs only. The measurement subset shown at the lower part of FIG. 6 is a set of the subframes fulfilling the above condition and consists of 5 subframes with the exception of the subframes configured for transmitting SIB-1.

A description is made in detail hereinafter with reference to FIG. 7 of the method for providing the first to third pattern in order for the resource restriction transmission unit 303 of the first eNB to control a macro UE to measure RSRP and RSRQ.

Figure 7:
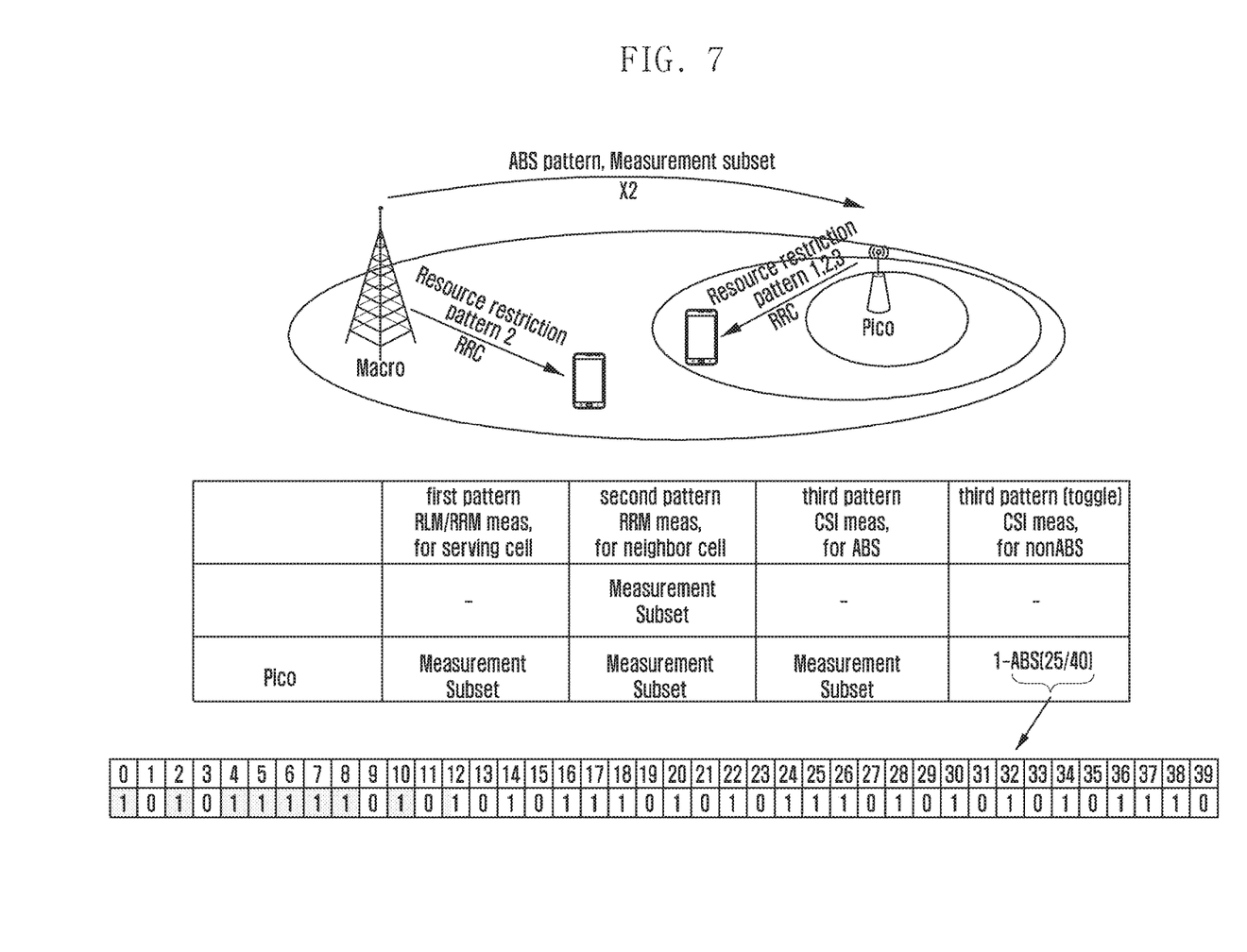
FIG. 7 is a diagram illustrating the first to third pattern information of the resource restriction according to an embodiment of the present invention.

FIG. 7 is a diagram illustrating the first to third pattern information of the resource restriction according to an embodiment of the present invention.

Referring to FIG. 7, the macro control unit 301 may use the measurement subset of FIG. 7 to generate the 40-bit information of the second pattern (pattern 2) for use by the macro UE 311 in measuring RSRP and RSRQ of the interference aggressor cell. That is, the UE served by the first eNB 300 is guided to measure the RSRP and RSRQ of the interference aggressor cell during the subframes belonging to the measurement subset. This operation makes it possible for the UE served by the first eNB close to the CRE area to detect the signal from the second eNB and to measure the RSRP and RSRQ in the ABSs in which the Tx power of the first eNB is low.

If it is determined, by the macro control unit 301, to allocate radio resources, data communication is performed with the UE using the allocated radio resources at step S503.

Figure 8:
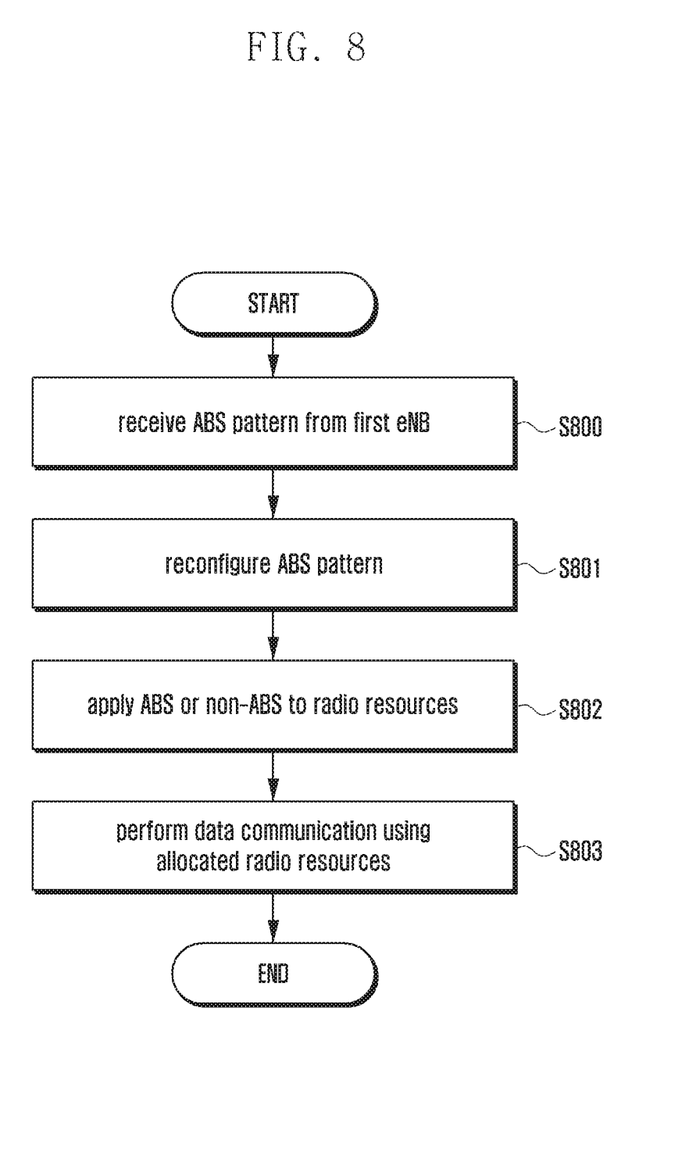
FIG. 8 is a flowchart illustrating a method for the second eNB to allocate resources based on the ABS pattern generated by the first eNB according to an embodiment of the present invention.

A description is made in detail hereinafter of the method for the second eNB to allocate resources based on the ABS pattern of the first eNB.

FIG. 8 is a flowchart illustrating a method for the second eNB to allocate resources based on the ABS pattern generated by the first eNB according to an embodiment of the present invention.

In the resource allocation method of the second eNB according to the embodiment of FIG. 8, the pico control unit 401 receives an ABS pattern from the ABS pattern reception unit 402 at step S800, the ABS pattern being transmitted by the ABS pattern transmission unit of the first eNB 300.

The pico control unit 401 reconfigures the ABS pattern according to the type of the data transmitted by at least one of the first and second eNBs 300 and 400 at step S801.

The first ABS pattern reconfiguration rule of the pico control unit 401 is to reconfigure the subframes carrying the SIB-1 of the first eNB as non-ABSs.

The second ABS pattern reconfiguration rule of the pico control unit 401 is to reconfigure the subframes carrying the Primary Synchronization Signal (PSS)/Secondary Synchronization Signal (SSS)/Physical Broadcast Channel (PBCH) as non-ABSs.

This is because it is preferable to handle the subframes carrying the PSS, SSS, and PBCH that affect interference channel estimation of the user as non-ABSs. Among subframes 0 to 39 of the exemplary ABS pattern of FIG. 6, subframes 5 and 25 carry the SIB-1, and subframes 0, 10, 20, and 30 carry the PSS, SSS, and PBCH.

The third ABS pattern reconfiguration rule of the pico control unit 401 is to reconfigure the subframes carrying a Paging Control Channel (PCCH) as non-ABSs regardless of the ABS pattern. In FIG. 6, subframes 9, 19, 29, and 39 carry the PCCH.

The pico control unit 401 may not apply at least one of the first to third ABS pattern reconfiguration rules to reconfigure the ABS pattern.

The pico control unit 401 may apply the non-ABS or ABS to the radio resources of the second eNB 400 according to the reconfigured ABS pattern at step S802.

In detail, the CRE UE management unit 411 may check the cause of the handover of the UE to the second eNB 400 to determine whether the corresponding UE is a CRE UE, and the pico control unit 401 may allocate radio resources differently depending on the determination result.

In detail, the pico control unit 401 controls the second eNB to wait for an ABS and transmit the RAR message in the ABS in order for the CRE UE to receive the RAR message because it is difficult to guarantee that the CRE UE can receive the RAR message transmitted by the second eNB in a non-ABS of the first eNB during the handover of the CRE UE from the first eNB to the second eNB. If the UE which is handed over to the second eNB 400 is a non-CRE UE, the RAR message transmission restriction is not applied. The pico control unit 401 may determine whether to apply the RAR message transmission restriction and apply the RAR message transmission restriction depending on the determination result.

If it is necessary to transmit a PDSCH to the CRE UE, the pico control unit 401 may control to wait for an ABS and transmit the PDSCH in the ABS. This aims to guarantee that the CRE UE receives the PDCCH and PDSCH stably. In the case of a non-CRE UE, the PDSCH transmission restriction may not be applied.

If it is necessary for the CRE UE to transmit a PUSCH, the pico control unit 401 may control to transmit a PDCCH carrying the UL grant in the ABS appearing periodically. This aims to guarantee that the CRE receives the UL grant and PHICH (ACK/NACK information) corresponding to the previous transmission stably. In the case of a non-CRE UE, the PUSCH-related restriction may not be applied.

The pico control unit 401 may control the SIB-1 transmission unit 408 of the second eNB 400 to transmit the SIB-1 in the SIB-1 Tx subframe (ABS) with the RB utilization restriction for preventing the first and second eNBs 300 and 400 from transmitting the SIB-1 in the same RB. For example, the pico control unit may control the SIB-1 transmission unit to transmit the SIB-1 in the consecutive RBs with the highest indices.

The pico control unit 401 may also control to transmit the SIB-1 to the UE equipped with the FeICIC function through higher level signaling based on the information received from the eICIC/FeICIC management unit 410, the information indicating whether the pico UE 420 supports the FeICIC function. The SIB-1 transmission unit 408 generates SIB-1 and transmits the SIB-1 according to the determination of the pico control unit 410. The SIB-1 transmission unit 408 may also transmit the SIB-1 to the UE supporting the FeICIC function through higher level signaling.

The pico control unit 401 may also not apply the paging message transmission restriction to the UE served by the second eNB 400. However, only when an event triggering transmission of a paging message to the CRE UE such as Commercial Mobile Alert Service (CMAS) message and Earthquake and Tsunami Warning System (ETWS) is detected, the pico control unit 401 may control the forced HO execution unit 412 to hand the CRE UE over forcibly to the first eNB by taking notice that it is not guaranteed for the CRE UE to receive the paging message safely. The forced HO execution unit 412 may hand the CRE UE over to the first eNB with priority.

The pico control unit 301 may also generate the first pattern (pattern 1), second pattern (pattern 2), and third pattern (pattern 3) for use by the pico UE 420 served by the second eNB 400 in measuring radio resources based on the subframe set information provided by the measurement subset reception unit 403, the subframe set information being transmitted by the first eNB 300. The first to third patterns are sent to the resource restriction transmission unit 404. Referring to FIG. 7, the first pattern (pattern 1) makes it possible to apply the subframe set transmitted by the first eNB without modification such that the UE served by the second eNB performs Radio Resource Measurement (RRM) and Radio Link Monitoring (RLM) on the serving cell during the ABSs in which the Tx power of the first eNB is decreased.

Also, the second pattern (pattern 2) may make it possible to apply the received subframe set with modification such that the UE served by the second eNB performs RRM on the interference aggressor cell during the ABSs in which the Tx power of the first eNB is decreased.

The third pattern (pattern 3) may make it possible to measure channel quality during the ABSs belonging to the received subframe set and toggle the ABS pattern for maximum ABS ratio to measure the channel quality in the subframes that are always non-ABSs.

The resource restriction transmission unit 404 may transmit the first to third patterns to the pico UE 420 such that the UE measures the channel qualities of the serving and interference aggressor eNBs in the ABS and non-ABS.

Although various embodiments of the present disclosure have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention. Thus, the technical scope of the present invention encompasses not only those embodiments described above, but also all that fall within the scope of the appended claims.

The invention claimed is:

1. A resource allocation method by a macro base station in a heterogeneous network system, the method comprising:
   generating an almost blank subframe (ABS) pattern based on a type of data, the data being transmitted from the macro base station to a user equipment (UE) via higher layer signaling; and
   performing data communication using radio resources based on the ABS pattern,
   wherein the ABS pattern is reconfigured by a pico base station when a signal is configured to be transmitted by the macro base station in an ABS according to the ABS pattern.

2. The method of claim 1, further comprising:
   determining a ratio of the ABS to the non-ABS before generating the ABS pattern, wherein the ABS pattern is generated according to the ABS ratio.

3. The method of claim 1, further comprising transmitting the ABS pattern to the pico base station.

4. The method of claim 1, wherein the generating of the ABS pattern comprises designating subframes carrying system information block 1 (SIB-1) of the macro base station as the ABSs.

5. The method of claim 1, wherein the generating of the ABS pattern comprises designating subframes carrying a physical hybrid automatic repeat request (HARQ) indicator channel (PHICH) corresponding to a physical downlink control channel (PDCCH) transmitted to a UE served by the pico base station as the ABSs.

6. The method of claim 1, wherein the generating of the ABS pattern comprises designating subframes predicted to carry a random access response (RAR) message for accepting access of a UE to be handed over to the pico base station as the ABSs.

7. The method of claim 1, wherein the generating of the ABS pattern comprises designating subframes carrying a paging message transmitted to a UE served by the macro base station as the non-ABSs.

8. A macro base station for allocating radio resources in a heterogeneous network system, the macro base station comprising:
   a transceiver; and
   at least one processor configured to:
      generate an almost blank subframe (ABS) pattern based on a type of data, the data being transmitted from the macro base station to a user equipment (UE) via higher layer signaling, and
      control the transceiver to perform data communication using radio resources based on the ABS pattern,
   wherein the ABS pattern is reconfigured by a pico base station when a signal is configured to be transmitted by the macro base station in an ABS according to the ABS pattern.

9. The first macro base station of claim 8,
wherein the at least one processor is further configured to generate the ABS pattern according to an ABS ratio indicating a ratio of ABSs to non-ABSs among entire subframes during an ABS pattern generating period.

10. The macro base station of claim 8, wherein the at least one processor is further configured to control the transceiver to transmit the ABS pattern to pico base station.

11. A resource allocation method by a pico base station in a heterogeneous network system, the method comprising:
receiving, from a macro base station, an almost blank subframe (ABS) pattern generated based on a type of data, the data being transmitted from the macro base station to a user equipment (UE) via higher layer signaling;
reconfiguring the ABS pattern when a signal is configured to be transmitted by the macro base station in an ABS according to the ABS pattern; and
performing data communication using radio resources based on the reconfigured ABS pattern.

12. The method of claim 11, wherein reconfiguring the ABS pattern comprises reconfiguring subframes carrying system information block 1 (SIB-1) of the macro base station as the non-ABSs.

13. The method of claim 11, wherein reconfiguring the ABS pattern comprises reconfiguring subframes carrying at least one of a primary synchronization signal (PSS), a secondary synchronization signal (SSS), and a physical broadcast channel (PBCH) as the non-ABSs.

14. The method of claim 11, wherein reconfiguring the ABS pattern comprises reconfiguring subframes carrying a paging control channel (PCCH) of the macro base station as the non-ABSs.

15. The method of claim 11, further comprising:
designating a random access response (RAR) message for accepting access of a UE to be handed over to the pico base station as the ABSs.

16. The method of claim 11, further comprising:
designating physical downlink shared channel (PDSCH) or physical uplink shared channel (PUSCH) for a UE to the ABSs.

17. The method of claim 11, further comprising:
designating the SIB-1 of the pico base station to a resource block (RB) which is different from the RB for the SIB-1 of the macro base station in the subframe carrying the SIB-1 of the macro base station.

18. A pico base station for allocating radio resources in a heterogeneous network system, the pico base station comprising:
a transceiver; and
at least one processor configured to:
control the transceiver to receive, from a macro base station, an almost blank subframe (ABS) pattern generated based on a type of data, the data being transmitted from the macro base station to a user equipment (UE) via higher layer signaling,
reconfigure the ABS pattern when a signal is configured to be transmitted by the macro base station in an ABS according to the ABS pattern, and
control the transceiver to perform data communication using radio resources based on the reconfigured ABS pattern.

19. The pico base station of claim 18, wherein the at least one processor is further configured to reconfigure subframes carrying system information block 1 (SIB-1) of the macro base station as the non-ABSs.

20. The pico base station of claim 18, wherein the at least one processor is further configured to reconfigure subframes carrying at least one of a primary synchronization signal (PSS), a secondary synchronization signal (SSS), and a physical broadcast channel (PBCH) as the non-ABSs.

* * * * *